US009354718B2

(12) United States Patent
Vesely et al.

(10) Patent No.: US 9,354,718 B2
(45) Date of Patent: May 31, 2016

(54) TIGHTLY COUPLED INTERACTIVE STEREO DISPLAY

(75) Inventors: Michael A. Vesely, Santa Cruz, CA (US); David A. Chavez, San Jose, CA (US); Douglas C. Twilleager, Campbell, CA (US)

(73) Assignee: zSpace, Inc., Sunnyvale, CA (US)

( * ) Notice: Subject to any disclaimer, the term of this patent is extended or adjusted under 35 U.S.C. 154(b) by 1074 days.

(21) Appl. No.: 13/300,424

(22) Filed: Nov. 18, 2011

(65) Prior Publication Data

US 2012/0162204 A1   Jun. 28, 2012

(51) Int. Cl.
| | | |
|---|---|---|
| *G06T 15/00* | (2011.01) | |
| *G06F 3/03* | (2006.01) | |
| *H04N 13/02* | (2006.01) | |
| *H04N 13/04* | (2006.01) | |
| *G06T 15/10* | (2011.01) | |
| *G06T 17/00* | (2006.01) | |
| *G06T 17/20* | (2006.01) | |
| *G06T 19/00* | (2011.01) | |

(52) U.S. Cl.
CPC .......... *G06F 3/0325* (2013.01); *H04N 13/0278* (2013.01); *H04N 13/04* (2013.01); *H04N 13/0468* (2013.01); *H04N 13/0481* (2013.01); *G06T 15/00* (2013.01); *G06T 15/10* (2013.01); *G06T 17/00* (2013.01); *G06T 17/20* (2013.01); *G06T 19/00* (2013.01)

(58) Field of Classification Search
CPC ......... G06T 19/00; G06T 17/20; G06T 17/00; G06T 15/10; G06T 15/00
USPC ......... 345/173, 100, 419, 633, 427, 156, 650, 345/179, 661, 157, 175
See application file for complete search history.

(56) References Cited

U.S. PATENT DOCUMENTS

| | | | | |
|---|---|---|---|---|
| 6,064,354 | A  * | 5/2000 | DeLuca ............................ 345/7 |
| 6,163,336 | A  * | 12/2000 | Richards ........................ 348/42 |
| 6,198,485 | B1 | 3/2001 | Mack et al. |
| 6,392,689 | B1 * | 5/2002 | Dolgoff ......................... 348/44 |
| 6,512,892 | B1 * | 1/2003 | Montgomery ..... H04N 13/0011 348/E13.008 |
| 6,614,427 | B1 * | 9/2003 | Aubrey ......................... 345/419 |

(Continued)

OTHER PUBLICATIONS

Daniel Cooper, "Microsoft HoloDesk: when you need to juggle something that isn't there (video)," engadget, Oct. 20, 2011, http://www.engadget.com/2011/10/20/microsoft-holodesk-when-you-need-to-juggle-something-that-isnt/, 1 page. [Retrieved Feb. 8, 2012].

(Continued)

*Primary Examiner* — Abderrahim Merouan
(74) *Attorney, Agent, or Firm* — Meyertons Hood Kivlin Kowert & Goetzel, P.C.; Jeffrey C. Hood; Mark S. Williams (57) ABSTRACT

Modifying perspective of stereoscopic images provided by one or more displays based on changes in user view, user control, and/or display status. A display system may include a housing, a display comprised in the housing, and one or more tracking sensors comprised in the housing. The one or more tracking sensors may be configured to sense user view and/or user control position and orientation information. The one or more tracking sensors may be associated with a position and orientation of the display. The user view and/or user control position and orientation information may be used in generating the rendered left and right eye images for display.

26 Claims, 7 Drawing Sheets

(56) References Cited

U.S. PATENT DOCUMENTS

| | | | |
|---|---|---|---|
| 6,882,953 B2* | 4/2005 | D'Hooge et al. | 702/150 |
| 6,993,206 B2* | 1/2006 | Ishino et al. | 382/291 |
| 7,203,911 B2 | 4/2007 | Williams | |
| 7,321,682 B2* | 1/2008 | Tooyama et al. | 382/154 |
| 7,646,372 B2 | 1/2010 | Marks et al. | |
| 7,898,522 B2* | 3/2011 | Hildreth et al. | 345/156 |
| 8,274,535 B2* | 9/2012 | Hildreth et al. | 345/676 |
| 8,717,423 B2* | 5/2014 | Vesely et al. | 348/51 |
| 8,854,356 B2* | 10/2014 | Oyagi et al. | 345/419 |
| 2003/0026474 A1* | 2/2003 | Yano | 382/154 |
| 2004/0008337 A1* | 1/2004 | Boman | 356/139.03 |
| 2004/0223219 A1* | 11/2004 | Tooyama et al. | 359/464 |
| 2005/0036673 A1* | 2/2005 | Ohba et al. | 382/154 |
| 2005/0057579 A1* | 3/2005 | Young | 345/649 |
| 2005/0207486 A1* | 9/2005 | Lee | H04N 13/0239 375/240.01 |
| 2006/0033713 A1 | 2/2006 | Pryor | |
| 2006/0038880 A1* | 2/2006 | Starkweather et al. | 348/51 |
| 2006/0227151 A1* | 10/2006 | Bannai | 345/633 |
| 2006/0250392 A1* | 11/2006 | Vesely et al. | 345/419 |
| 2007/0236514 A1* | 10/2007 | Agusanto et al. | 345/646 |
| 2007/0252832 A1 | 11/2007 | Ratai | |
| 2008/0018595 A1* | 1/2008 | Hildreth et al. | 345/156 |
| 2010/0013860 A1* | 1/2010 | Mandella et al. | 345/650 |
| 2010/0066763 A1* | 3/2010 | MacDougall | G06F 1/1626 345/656 |
| 2010/0105475 A1* | 4/2010 | Mikhailov et al. | 463/33 |
| 2010/0128112 A1 | 5/2010 | Marti et al. | |
| 2010/0156907 A1* | 6/2010 | Vanderspek et al. | 345/427 |
| 2010/0171697 A1* | 7/2010 | Son et al. | 345/158 |
| 2011/0002508 A1* | 1/2011 | Basso et al. | 382/103 |
| 2011/0248987 A1* | 10/2011 | Mitchell | G06T 15/20 345/419 |
| 2012/0038635 A1* | 2/2012 | Stamate et al. | 345/419 |
| 2012/0086631 A1* | 4/2012 | Osman et al. | 345/156 |

OTHER PUBLICATIONS

Wolfgang Kruger, Christian-A. Bohn, Bernd Frohlich, Heinrich Schuth, Wolfgang Strauss, and Gerold Wesche, "The Responsive Workbench A Virtual Work Environment for Scientists, Engineers, Physicians, and Architects," Dept. of Visualization and Media Systems Design, GMD German Research Center for Computer Technology, Jun. 29, 1994, 15 pages.

Leonar3Do—You are capable of more then you think, Leonar3Do—Partnership, http://www.leonar3do.com/index.php?option=com_content&view=article&id=23&Itemid=4&lang=en, 2 pages. [Retreieved Feb. 8, 2012].

Billy Steele, "Wacom Cintiq 24HD images break cover, we start practicing our stick figures," engadget, Sep. 12, 2011, http://www.engadget.com/2011/09/12/wacom-cintiq-24hd-images-break-cover-we-start-practicing-our-st/, 1 page. [Retrieved Sep. 13, 2011].

Georgia Albuquerque, Hyosun Kim, Sven Havemann, and Dieter W. Fellner, "3D Modelling with Vision Based Interaction in Semi-Immersive Enviroments," Technical Report TUBS-CG-2004-01, Institute of Computer Graphics University of Technology, 2004, 6 pages.

Jurriaan D. Mulder and Breght R. Boschker, "A Modular System for Collaborative Desktop VR/AR with a Shared Workspace," IEEE Virtual Reality Conference, Mar. 27-31, 2004 in Chicago, Illinois (8 pages).

* cited by examiner

TIGHTLY COUPLED INTERACTIVE STEREO DISPLAY

RELATED APPLICATIONS

This application is related to U.S. patent application Ser. No. 13/019,384, entitled "Modifying Perspective of Stereoscopic Images Based on Changes in User Viewpoint", by Michael A. Vesely, Nancy L. Clemens, and Alan S. Gray, filed Feb. 2, 2011, which is a continuation-in-part of U.S. patent application Ser. No. 11/429,829, entitled "Three Dimensional Horizontal Perspective Workstation", which claims priority to U.S. provisional application Ser. No. 60/679,633, filed May 9, 2005, entitled "Three dimensional horizontal perspective workstation", each of which are incorporated by reference in their entirety as though fully and completely set forth herein. This application is also related to U.S. Patent Application Ser. No. 61/426,448, entitled "Three-Dimensional Tracking of Objects in a 3-D Scene", by David Chavez, Milind Paranjpe, Jerry Tu, and Michael Cheponis, filed Dec. 22, 2010, which is incorporated by reference in its entirety as though fully and completely set forth herein. This application is also related to U.S. Patent Application Ser. No. 61/426,451, entitled "Three-Dimensional Collaboration", by Michael A. Vesely, Jerry Tu, and Peter F. Ullmann, filed Dec. 22, 2010, which is incorporated by reference in its entirety as though fully and completely set forth herein.

TECHNICAL FIELD

This disclosure relates to three-dimensional (3D) displays, and in particular, to an interactive 3D display environment.

DESCRIPTION OF THE RELATED ART

Current 3D interactive display systems typically use gross, disassociated means to allow a user to interact. The resulting environment lacks accuracy, realism, and limits user experience.

SUMMARY

A three-dimensional (3D) interactive display system is disclosed. The system may include a display system that includes a housing and a display comprised in the housing and configured to display a rendered left eye image and a rendered right eye image. The system may also include one or more tracking sensors comprised in the housing and configured to sense at least a first input and a second input within a volume region. The sensed first input may include user view position and orientation information. The sensed second input may include user control position and orientation information. The one or more tracking sensors may be associated with a position and orientation offset of the display. In various embodiments, the user view position and orientation information and the user control position and orientation information may be used in the generating the rendered left and right eye images for display. In one embodiment, the system may include a tracking system coupled to the display system configured to determine tracking values based on a least a portion of the user view position and orientation information and user control position and orientation information. The system may also include a content processing system configured to generate the rendered left and right eye images based on the determined tracking values.

BRIEF DESCRIPTION OF THE DRAWINGS

A better understanding of the present disclosure can be obtained when the following detailed description is considered in conjunction with the following drawings.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Terms

The following is a list of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene.

Eyepoint—the physical location (and/or orientation) of a single eye or a pair of eyes. A viewpoint above may correspond to the eyepoint of a person. For example, a person's eyepoint has a corresponding viewpoint.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective which is rendered from a viewpoint which is not perpendicular to the display surface. More particularly, the term "horizontal perspective" may typically refer to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint.

Comprising—this term is open-ended. As used in the appended claims, this term does not foreclose additional structure or steps. Consider a claim that recites: "An apparatus comprising a liquid crystal display . . . . " Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a 3D display system having multiple sensors, the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
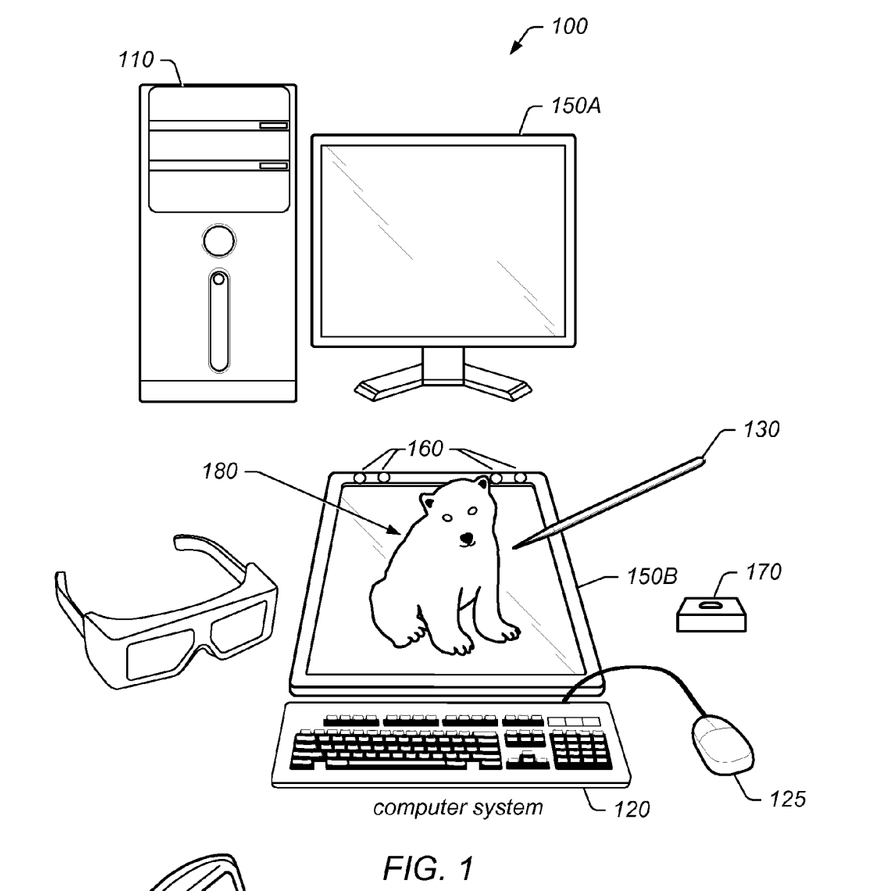
FIGS. 1-3 illustrate example systems configured to implement various embodiments.
Figure 2:
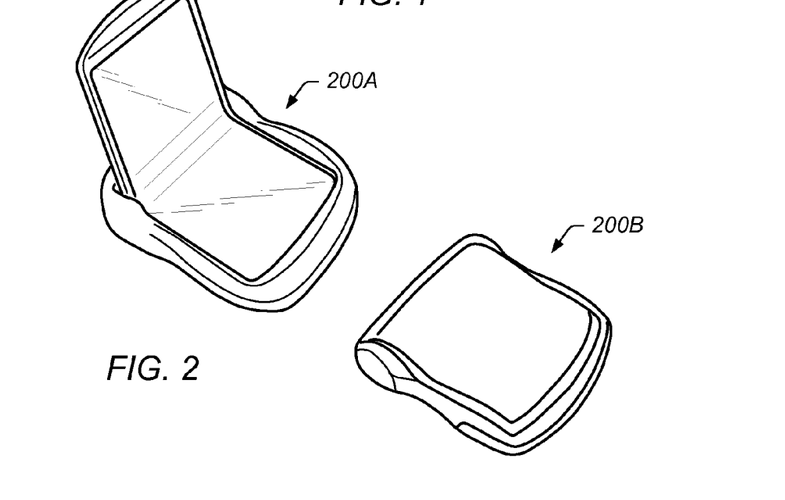
Figure 3:
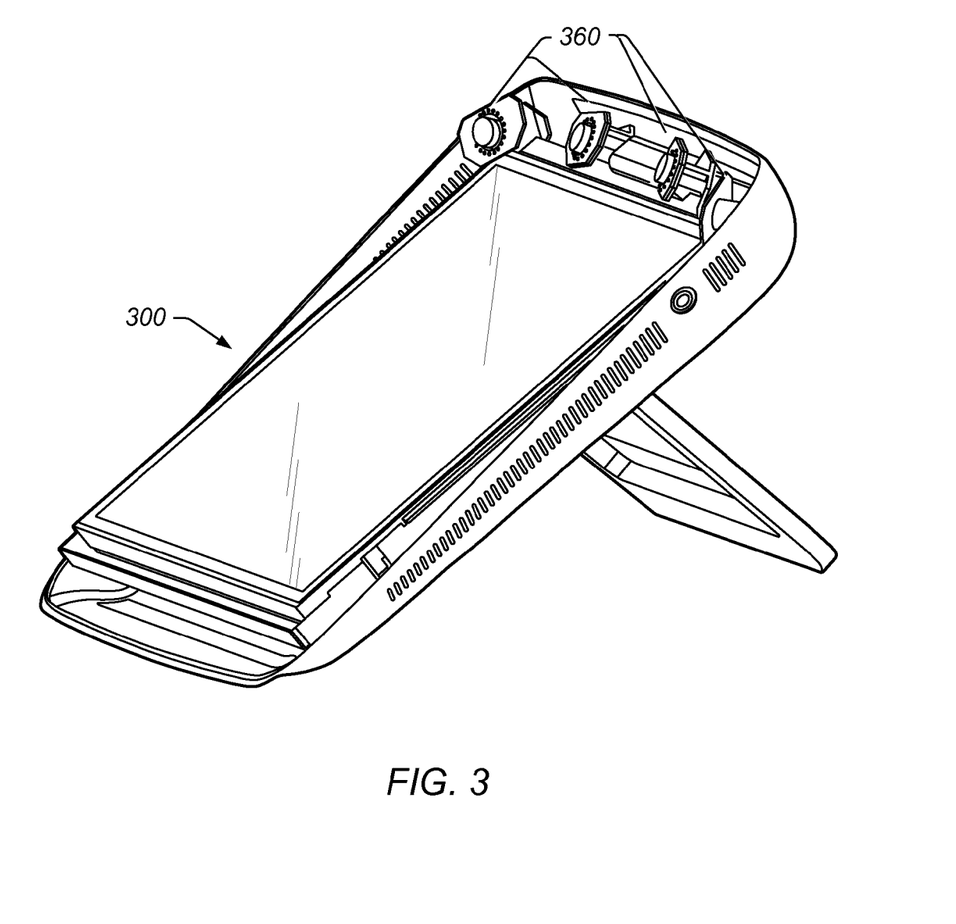

FIGS. 1-3—Exemplary Systems

FIGS. 1-3 illustrate exemplary systems that may be configured to perform various embodiments described below.

In the embodiment of FIG. 1, computer system 100 may include chassis 110, display 150A and display 150B (which may collectively be referred to as display 150 or "at least one display" 150), keyboard 120, mouse 125, stylus 130, eyewear 140, at least two cameras 160, and stylus caddy 170. As described herein at FIGS. 4 and 5, in some embodiments, two displays 150A and 150B may not be presented; instead, a single display 150 may be used in such embodiments. In various embodiments, at least one of the displays 150A and 150B is a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, memory mediums (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. The memory medium may also store data (e.g., a computer model) representing a virtual space, which may be used for projecting a 3D scene of the virtual space via the display(s) 150. Further, one or more memory mediums may store software which are executable to perform three-dimensional spatial tracking (e.g., user view tracking, user control tracking, etc.), content processing, or other features, as described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images) using the display 150A and/or the display 150B. The computer system 100 may also be configured to display a "view" of the 3D scene using the display 150A, the display 150B, and/or another display, as described in more detail below. The "view" of the 3D scene may refer to displaying a portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display.

It should be noted that the embodiment of FIG. 3 is exemplary only, and other numbers of displays are envisioned. For example, the computer system 100 may include only a single display or more than two displays, or the displays may be arranged in different manners than shown. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided herein. Additionally, while the displays 150 are shown as flat panel displays, they may be any type of system which is capable of displaying images, e.g., projection systems. For example, displays 150 may be, for example, a CRT (cathode ray tube) monitor, a LCD (liquid crystal display) monitor, a front projection or a back projection screen or surface with a plurality of projectors. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be referred to as an illusion since the actual provided images are 2D, but the scene is conveyed in 3D via the user's interpretation of the provided images. In order to properly view the stereoscopic images (one for each eye), the user may wear eyewear 140. Eyewear 140 may be anaglyph glasses, polarized glasses, shutter glasses, lenticular glasses, etc. Using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens has the corresponding orthogonal polarization for receiving the corresponding image. With shutter glasses, each lens is synchronized to alternations of left and right eye images provided by the display(s) 150. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror, lens, and the like. Large convex or concave lenses can also be used to receive two separately projected images to the user.

In one embodiment, eyewear 140 may be used as a position input device to track the user view (e.g., eyepoint) of a user viewing a 3D scene presented by the system 100. For example, eyewear 140 may provide information (e.g., position, orientation, etc.) that is usable to determine the position and orientation of the eyepoint(s) of the user, e.g., via triangulation. The position input device can include an infrared detection system to detect the position of the viewer's head to allow the viewer freedom of head movement or use a light sensitive detection system. Other embodiments of the input device can be the triangulation method of detecting the viewer eyepoint location, such one or more sensors (e.g., two cameras, such as CCD cameras) providing position and/or orientation data suitable for the head tracking. The input device can be manually operated by the viewer, such as a keyboard, mouse, trackball, joystick, or the like, to indicate the correct display of the horizontal perspective display images. However, any method for tracking the position of the user's head or eyepoint may be used. Accordingly, the 3D scene may be rendered from the perspective of the user such that user can view the 3D scene with minimal distortions (e.g., since it is based on the eyepoint of the user). Thus, the 3D scene may be particularly rendered for the eyepoint of the user, using the position input device. In some embodiments, each eyepoint may be determined separately, or a single eyepoint may be determined and an offset may be used to determine the other eyepoint.

The relationship among the position/orientation of the display(s) 150 and the eye(s) position of the user may be used to map a portion of the virtual space to the physical space of the system 100. In essence, the physical space and components used are to be mapped to the virtual model in order to accurately render a 3D scene of the virtual space.

One or more of the user input devices (e.g., the keyboard 120, the mouse 125, the stylus 130, pointing device, user control device, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with "open space" portions of the 3D scene. Thus, at least a portion of the 3D scene may be presented in this "open space", which is in front of or otherwise outside of the at least one display. And at least a portion of the 3D scene may appear as a hologram above the surface of the display 150. For example, when the horizontal display 150B is used, the 3D scene may be seen as hovering above the horizontal display. It should be noted however, that a portion of the 3D scene may also be presented as appearing behind the display surface, which is not in "open space". Thus, "open space" refers to a space which the user is able to freely move and interact with (e.g., where the user is able to place his hands in the space) rather than a space the user cannot freely move and interact with (e.g., where the user is not able to place his hands in the space, such as below the display surface). This "open space" may be referred to as a "hands-on volume" as opposed to an "inner-volume", which may be under the surface of the display(s). Thus, the user can interact with virtual objects in the open space because they are proximate to the user's own physical space. The inner volume is located behind the viewing surface and presented objects appear inside the physically viewing device. Thus, objects of the 3D scene presented within the inner volume do not share the same physical space with the user and the objects therefore cannot be directly, physically manipulated by hands or hand-held tools such as stylus 130. That is, they may be manipulated indirectly, e.g., via a computer mouse, a joystick, or virtual representations of hands, handheld tools, or a stylus.

In some embodiments, system 100 may include one or more sensors 160. FIG. 3 illustrates an embodiment using four cameras 160. For instance, two of the four cameras 160 may be used to sense a user view (e.g., eyepoint) and the other two cameras 160 may be used to sense a user control (e.g., pointing device, stylus, hand, glove, etc.). Sensors 160 may be used to image a user of system 100, track a user's movement, or track a user's head or eyes. In one embodiment, cameras 160 may track a position and an orientation of stylus 130. The information regarding the position and/or orientation of the stylus 130 provided by the one or more sensors 160 may be used in conjunction with other positional information of the system (e.g., an accelerometer and/or gyroscope within the stylus itself) to perform more precise 3D tracking of the stylus 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store stylus 130. Caddy 170 may also be used to calibrate the orientation of the stylus to a known roll, pitch, and yaw. Caddy 170 may be in a fixed position relative to cameras 160.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically, at run-time and may be performed in real time. The 3D scene generator may also keep track of peripheral devices (e.g., stylus 130 or eyewear 140) to ensure synchronization between the peripheral device and the displayed image. The system can further include a calibration unit to ensure the proper mapping of the peripheral device to the display images and proper mapping between the projected images and the virtual images stored in the memory of the chassis 110.

System 100 can further comprise a binaural or 3D audio system such as a headphone or other speakers (not shown) to provide realistic sound simulation. As such, 3D audio may be produced by system 100 based on user view position and/or orientation and/or user control position and/or orientation.

System 100 may also include various biofeedback devices (not shown), such as a brain wave electrode, blood pressure, heart beat, respiration, perspiration, skin conductance, body temperature, muscle tension measurements and simulators for inputs and output with the users.

In further embodiments, the system 100 (e.g., the display(s) 150) can further comprise an image enlargement/reduction input device, an image rotation input device, and/or an image movement device to allow the viewer to adjust the view of the projection images.

Thus, the system 100 may present a 3D scene which the user can interact with in real time. The system may comprise real-time electronic display(s) 150 that can present or convey perspective images in the open space and a peripheral device 130 that may allow the user to interact with the 3D scene with hand controlled or hand-held tools. The system 100 may also include means to manipulate the displayed image such as magnification, zoom, rotation, movement, and even display a new image.

Further, while the system 100 is shown as including horizontal display 150B since it simulates the user's visual experience with the horizontal ground, any viewing surface could offer similar 3D illusion experience. For example, the 3D scene can appear to be hanging from a ceiling by projecting the horizontal perspective images onto a ceiling surface, or appear to be floating from a wall by projecting horizontal perspective images onto a vertical wall surface. Moreover, any variation in display orientation and perspective (or any other configuration of the system 100) are contemplated.

FIG. 2 illustrates another embodiment of the system 100, shown as 200A and 200B. In this embodiment, the system may be a foldable and/or portable system (e.g., similar to a laptop or tablet device) where the user may have the system 200 open (as shown in 200A) or closed (as shown in 200B). In this embodiment, the horizontal display and vertical display may be blended by a blending display. Thus, the display of the system 200 may be thought of as a plurality of combined displays, or a single display which is able to project horizontally and/or vertically, as desired.

FIG. 3 illustrates another embodiment of the system 100, shown as 300. The illustrated embodiment includes a single display with a tilt mechanism configured to tilt the display at varying angles from a flat tabletop configuration to nearly perpendicular to the tabletop. Example tilt configurations are shown in FIGS. 5A-D. FIG. 3 shows an approximate tilt of 30 degrees with respect to completely horizontal tilt setting (i.e., flat on the tabletop). As was the case with FIG. 1, the embodiment of FIG. 3 illustrates four sensors 360. Note that, in some embodiments, a system may include a single sensor device configured to perform both user view and user tracking. In some embodiments, display 150B of FIG. 1 may include the tilt mechanism shown in FIG. 3. Thus, in some instances, display 150B may actually be the display device shown in FIG. 3.

In some embodiments, as described herein, system 300 may include one or more processors, memory, and/or other logic configured to perform some of the tracking processing and/or content processing for displaying a 3D scene. In some embodiments, part of the processing may occur in the display 150 while other parts may occur in the chassis/PC. Still in other embodiments, standalone hardware and/or software may be configured to perform some of the processing.

Figure 4:
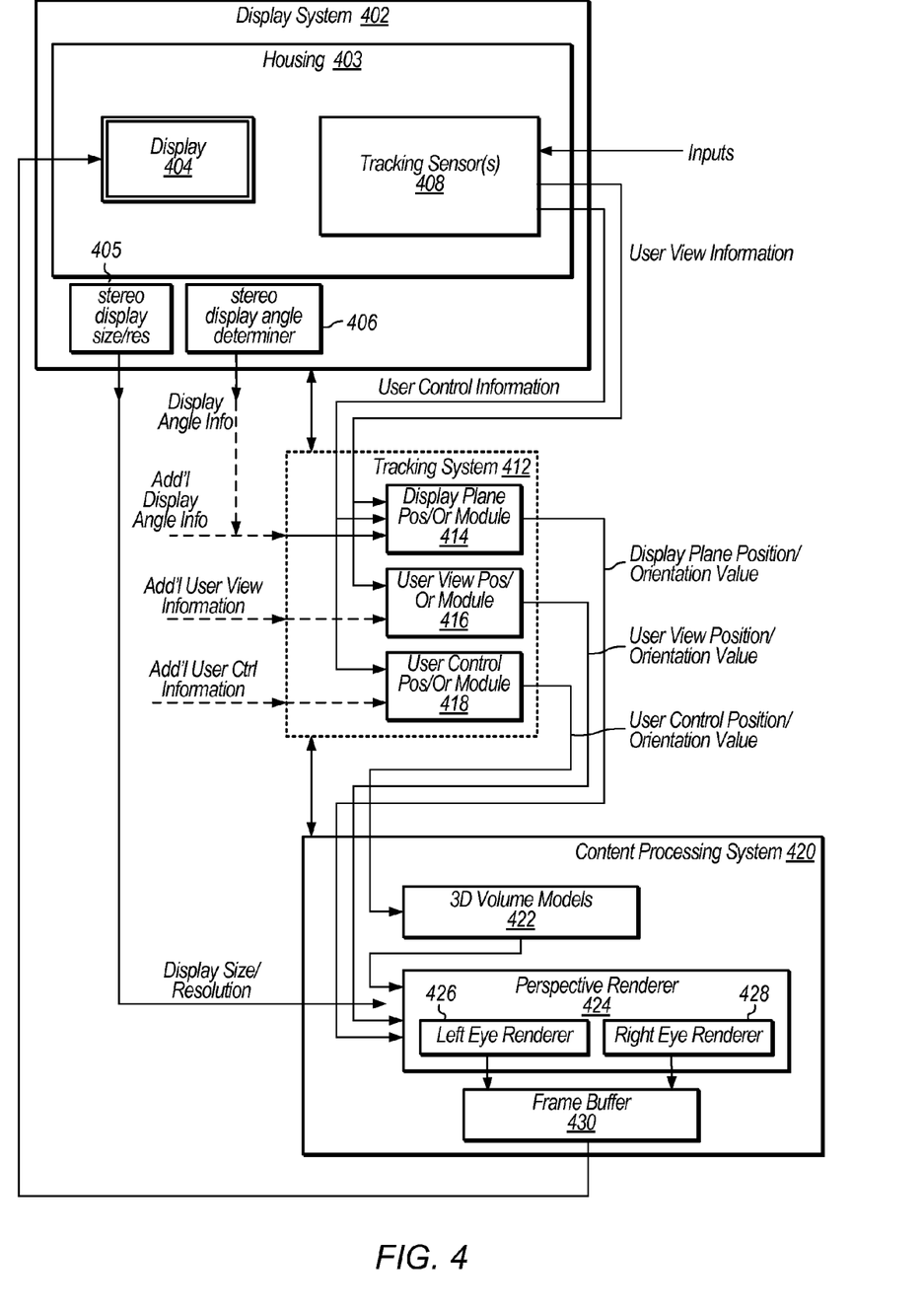
FIG. 4 is a block diagram illustrating an example system configured to present a three-dimensional display, according to some embodiments.

FIG. 4—Example 3D Display System

FIG. 4 is a block diagram illustrating an example system configured to present a direct interactive environment system, according to some embodiments. As shown, FIG. 4 includes display system 402, tracking system 412, and content processing system 420. As used herein, a direct interactive environment system may be, in one embodiment, a system in which a user may use a hand or hand held device to directly interact with rendered virtual objects within a physical view volume.

In various embodiments, display system 402 may include housing 403, display 404, one or more tracking sensors 408, stereo display size/resolution 405, and stereo display angle determiner 406. Display size/resolution 405 may be stored in memory in display system 402 and may include default settings (e.g., native resolution) and may also be user configured to adapt resolution settings. Stereo display angle determiner 406 may be configured to determine a display angle of display 404. For example, in the embodiment shown in FIG. 3, a tilting mechanism may enable display 406 to be tilted. Stereo display angle determiner 406 may be configured to determine the angle of the display 406 tilt and provide the information regarding the display angle for further processing to enable modification of the perspective of the 3D rendered images to adjust to the display angle. Stereo display angle determiner 406 may also be configured to store the determined angle in memory in display system 402. As described in more detail at FIGS. 5A-D, in various embodiments, stereo display angle determiner 406 may include an accelerometer, a gyroscope, an optic sensor based determiner and/or a latch system allowing a discrete set of display angles. Stereo display angle determiner 406 may additionally permit user entry of a display angle.

As described herein, the one or more tracking sensors 408 may include cameras, such as CCD cameras, IR cameras, sonic bounce sensors, other non-optical sensors, etc. Tracking sensor(s) 408 and display 404 may be comprised in housing 403 such that the tracking sensor(s) 408 and display 404 are embedded within display system 402. In other embodiments, tracking sensor(s) 408 may not be embedded within the display system 402. In various embodiments, the one or more tracking sensors 408 may be associated with a precision position and orientation offset of the display such that the tracking sensors may be tightly coupled to the display. To ensure the tight coupling, in one embodiment, the positioning/anchoring of the display 404 to the housing 403 and the positioning/anchoring of the tracking sensor(s) 408 to the housing 403 may be such that the positional offset of the display 404 to the tracking sensor(s) 408 is of a tolerance of approximately not more than +/−½ mm in any of x, y, and/or z, plus approximately not more than +/−½ degree in any pitch, yaw, or roll. In another embodiment, after the fixing of the display 404 and the tracking sensor(s) 408 to the housing 403 a precision calibration procedure may be performed to ensure the positional offset tolerance between the tracked physical object or user's head or eye position to the display is sensed by the tracking sensor(s) to be less than +/−½ mm. Thus, the sensors may be aligned in multiple dimensions (e.g., x, y, z, roll, pitch, yaw, etc.) to the display so the perspective of the user to the display is correlated to the virtual projective renderings of the content objects, and in turn, imaged on the display for viewing by the user. As one example, in one embodiment, display system 402 may include two tracking sensors 408. The two tracking sensors 408 may be embedded in display system 402 such that each of the two tracking sensors 408 have a specific position and orientation offset with respect to the surface of display 404. The offset may be with respect to an absolute origin point of the display surface or to a display surface center point as described in FIG. 6. Returning to the example, as the two tracking sensors 408 in the example would be located in a different location within display system 402 (e.g., two inches apart), each may have a unique specific position and orientation offset. Such association and tight coupling may enable a more realistic and fluid 3D scene.

The one or more tracking sensors 408 may be configured to sense at least two inputs within a volume region. For example, the one or more tracking sensors 408 may be configured to sense a first input correlating to user view position and/or orientation (e.g., eyepoint) information. The one or more tracking sensors 408 may also be configured to sense a second input correlating to user control (e.g., pointing device, stylus, hand, etc.) position and/or orientation information. The user view position and/or orientation information and user control position and/or orientation information may then be provided to tracking system 412. The volume region may be a preset region into the working volume of the stereo display. The working volume may be the volume (e.g., x,y,z coordinates) where the user may be tracked for both user view and user control.

In some instances, more than one user control device may be present and may be separately tracked. For example, the system may be configured to track both a stylus and a hand, or two styluses, in addition to the user's view, with each of the stylus and the hand having a separate tracking signature. Thus, input for user control/orientation may include one or more inputs for the stylus and one or more inputs for the hand. In various embodiments, a shared tracking sensor 408 may be used, or a different tracking sensor may be used for each user control being tracked.

In various embodiments, one or more tracking sensors 408 may be used to sense the first input and a different one or more tracking sensors 408 may be used to sense the second input. In other embodiments, the same one or more tracking sensors may be used to sense both the first and second inputs.

The one or more tracking sensors 408 may be configured to sense the user view and user control at the same time or at different times. For example, in an embodiment in which the sensing is performed at different times, sensing the first input (e.g., head tracking capture) may be performed during a first time period and sensing the second input (e.g., stylus tracking) may be performed during a second time period that does not overlap the first time period. In one embodiment, the one or more tracking sensors 408 may be IR cameras. During the first time period, a first light source (e.g., IR light) embedded in display system 402 may be activated. The IR light may reflect off the user eyewear 140 and may be captured/sensed by the IR camera(s). Timing a camera capture and light source activation sequence may be referred to as the camera synchronizing to the light source. During the second time period, a second light source (e.g., IR light from the stylus) may be activated and captured/sensed by the IR camera(s).

Figure 8A:
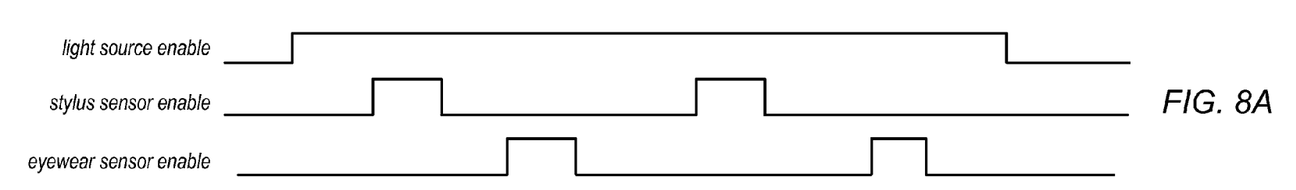
FIGS. 8A-D illustrate various examples of timing conditions for enabling of light source(s) and sensor(s).
Figure 8B:
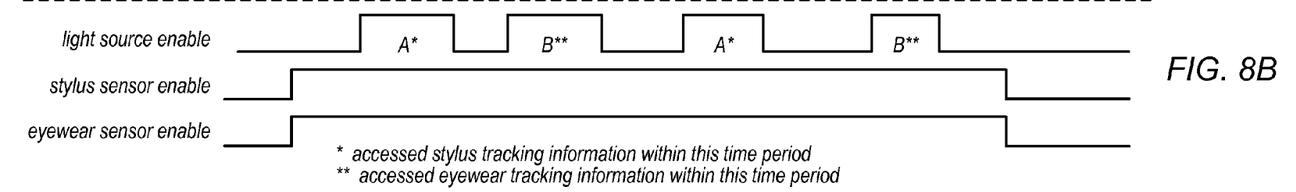
Figure 8C:
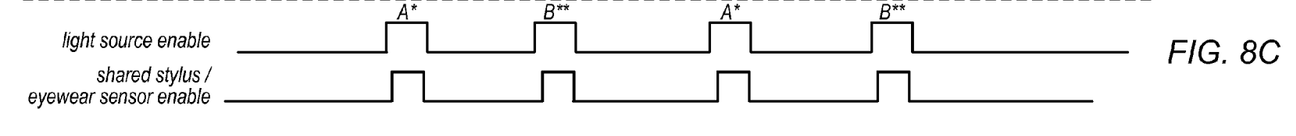
Figure 8D:
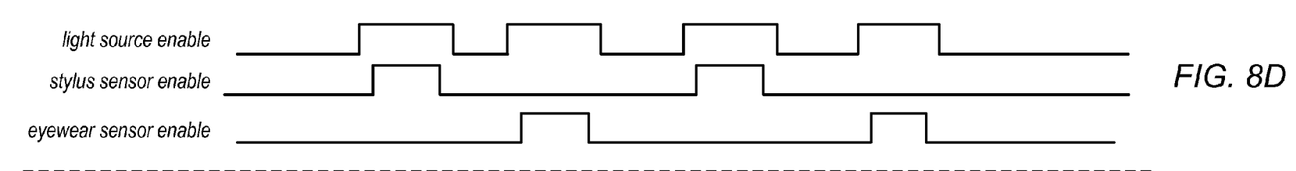
Figure 8E:
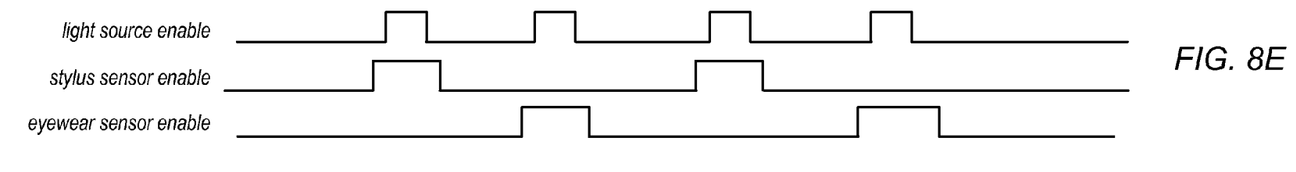

FIGS. 8A-D illustrate various examples of timing conditions for enabling of light source(s) and sensor(s). In FIG. 8A, one or more light sources may be enabled for a continuous period that include one or more separate user view and user control captures, corresponding to the eyewear sensor enable and stylus sensor enable, respectively. FIG. 8B illustrates a scenario in which the sensor enables for the stylus and eyewear overlaps. In such an example, different sensors may be used to capture stylus and eyewear position/orientation or a shared sensor or sensors maybe used to capture both. As shown, the sensor enables remain high while the light source enable is turned on to align with the capture data points used by the tracking system, noted in the figure by A (stylus data point) and B (eyewear data point). FIG. 8C is similar to FIG. 8B except that a shared sensor enable is used and the sensor enable does not continuously stay high for multiple captures. FIGS. 8D and 8E illustrate pulsing of each of the light source enable, stylus sensor enable, and eyewear sensor enable. Any number of other examples and variations of timing are also envisioned.

Turning back to FIG. 4, in various embodiments, the one or more tracking sensors 408 may be configured to capture information at a rate fast enough that the 3D interaction may be fluid and realistic. Example capture rates may be 30 times per second, 50 times per second, 100 times per second, etc. Thus, in some embodiments, each of the first and second time periods may be less than 3 ms.

Tracking system 412 may be coupled to display system 402 and content processing system 420. In various embodiments, tracking system may be configured to determine a user view position and orientation value and a user control position and orientation value based on at least a portion of the user view position and orientation information and user control position and orientation information, respectively, received from the one or more tracking sensors 406. The user view position and orientation value may, in some embodiments, include a number of values (e.g., 3 values for position, 3 for orientation (roll/pitch/yaw), etc.). Similarly, the user control position and orientation value may include a number of values. Collectively, tracking system 412 may store each of the values in a matrix of values. In some embodiments, tracking system 412 may receive additional input, such as display angle information from stereo display angle determiner 406. Tracking system 412 may also receive additional user view information. For instance, a pair of 3D eyewear may include a gyroscope or accelerometer to provide additional information regarding the position and/or orientation of the eyewear 140, and therefore the user view. As another example, tracking system 412 may receive additional user control information, such as information from a gyroscope and/or accelerometer in a stylus. Such information from the eyewear and/or stylus may be provided wired or wirelessly (e.g., via Bluetooth, IR, RF, etc.) to tracking system 412.

Based on at least some of the inputs received, tracking system 412 may determine at least one of: a display plane position and/or orientation value via display plane position/orientation module 414, a user view position/orientation value via user view position/orientation module 416, and/or a user control position/orientation value via user control position/orientation module 418. Note that each of the values referred to herein may actually be a matrix of values and are not necessarily a single value. The determined values may be provided to content processing system 420 for rendering one or more 3D display objects. In addition to determining the correlation between the head position and the angle of the display, in some embodiments, tracking system 412 may also store a preset, or derived, interocular distance between the eyes to create one or more offsets from the head position. In such embodiments, a preliminary user view position/orientation value may correspond to a user view center (e.g., bridge of the 3D eyewear 140) while the final determined user view position/orientation value may include one or more distinct values for each eye based on the preset or derived interocular distance between the eyes. The values calculated by tracking system 412 may be stored in a matrix and made available to a PC running a 3D graphics application or in response to queries. In some instances, each value may be a matrix of values or may be in a matrix (e.g., a position matrix, orientation matrix, user view matrix, etc.).

Referring to FIGS. 1 and 4, tracking system 412 may be located in chassis 110, display(s) 150A or 150B, or in a standalone component not shown in FIG. 3. In some embodiments, various components and/or processes of tracking system 412 may be implemented across multiple devices. For example, some aspects may be implemented in display(s) 150 while others may be implemented in a computing device such as chassis 110. Tracking system 412 may be implemented in hardware, firmware, or software. For example, tracking system 412 may be implemented in an FPGA, DSP, GPU or a computer-readable memory medium that stores instructions that are executable by a processor to implement the tracking system. In some embodiments, tracking system 412 may include a tracking processor that is a dedicated processor separate from other processors in system 100. In some embodiments, the each tracking sensor 408 may have its own tracking system 412 and include a tracking processor that is a dedicated processor separate from other processors of other tracking systems 412. For example, the processing of head tracking and stylus tracking may be performed with a separate processor from the PC processor such that the PC processor may not be diverted when performing image processing updating.

Additional detail for various tracking techniques is available in already incorporated-by-reference U.S. Patent Application Ser. No. 61/426,448, entitled "Three-Dimensional Tracking of Objects in a 3-D Scene", by David Chavez, Milind Paranjpe, Jerry Tu, and Michael Cheponis, filed Dec. 22, 2010.

Content processing system 420 may include 3D volume models 422, perspective renderer 424, including left and right eye renderers 426 and 428, and frame buffer 430. Not shown, content processing system 420 may include a processor and/or memory. In some embodiments, the components of content processing system 420 may be implemented as instructions in memory of a chassis/PC that is running a 3D graphics application. The program instructions may be executed by a processor of the PC, which may be a dedicated processor that is different than a processor running the 3D graphics application. Perspective renderer 424, including left and right eye renderers 426 and 428, may be configured to generate rendered left eye and right eyes images for display. The generation of the rendered left and right eye images may be based on the determined tracking values (e.g., user view and user control position and orientation values) received from tracking system 412. For example, the tracking values may be used to determine what frustum view to offset from the defined default application center view position. The rendered left and right eye images may be usable to display a 3D image of one or more display objects from a perspective of a user whose view and control are being tracked. The rendered left and right eye images may also be based on the determined display plane position and/or orientation value and/or the display size/resolution, as shown in FIG. 4. For example, the determined display plane position and/or orientation value may be used by the content processing system 420 to establish the render plane within the 3D volume frustum.

In one embodiment, 3D volume models 422 may include a database of 3D display objects that may be rendered for a particular application. 3D volume models 422 may refer to object models of an application space (e.g., a CAD application) and may interface with that application. Perspective renderer 424 may receive one or more display objects from 3D volume models 422 to generate the left and right eye images. The rendered left and right eye images may be stored in frame buffer 430 of content processing system 420. Various types of buffering (e.g., multiple buffering) may be used such that alternating frames of left eye and right eye images may be provided for display. A graphics processing unit (GPU) may send frames to the display synchronously (left, right, left, right, etc.), for example, at 120 frames per second (fps) or at a comparable rate. In one embodiment, system 400 may determine how to separate one part of a stream of frames from another such that the system knows which is a left eye frame and which is a right eye frame. Content processing system 420 may initiate a stereo initialization process that allows the system to determine which frame is left and which is right. The application may also send a request to the tracking system 412 to initiate a tracking process to query the sensor and provide the tracking system value(s). In some embodiments, an application may signal to tracking system 412 to enter and/or initialize 3D/stereo mode. As a result, the system may synchronize the rendered left and right eye images to left and right eye frames, respectively. After initialization, however, the system may receive a synchronous frame stream that alternates frames by eye; thus, the system may only need to synchronize the rendered left and right eye images to left and right eye frames, respectively, upon initialization.

Various components of content processing system 420 may be configured to poll tracking system 412 for the values generated by tracking system 412. For example, a 3D application or 3D volume models 422 may query tracking system 412 for user control value(s). The 3D application may then generate a cursor, pseudo laser beam, or other virtual representation of the stylus or other user control device. Additional processing may occur, for instance, if a control is actuated or a 3D spatial intersection is detected in context of the tracking system's user control position/orientation. In any event, the renderers may convey stylus object information for display. Likewise, a 3D application of content processing system 420 may query tracking system 412 for user view value(s), such as left eye and right eye position values. The 3D application may use those values to create the proper projection, based on the position value perspective in relation to a pre-identified correlation to the screen position. The renderers may generate the rendered left and right eye images based on that projection and provide the images to display system 402.

In various embodiments, 3D volume models 422 may interface with an application for displaying 3D scenes. Moreover, a 3D application may also directly interface with tracking system 412. An example usage pattern for an application performing stereo rendering may proceed as follows, according to one embodiment. The application may call a capture function that indicates to tracking system 412 to retrieve the latest cached information for each of head and stylus tracking. In other embodiments, an event model may be used and such polling may not be necessary. Once the capture function is executed, the application may poll tracking system 412 for the current head pose (e.g., user view position/orientation value(s)). The current head pose may be a portion of the user view position/orientation matrix. The application may similarly poll tracking system 412 for the current user control pose as well. The content processing system 420 may then request the current user view pose (and user control pose) from the application to make further calculations for rendering. The application may then query the content processing system 420 for those calculations. Then, the frame buffers may be addressed. For example, the buffer may be set for the left eye if the left eye is to be rendered first. A left view matrix and left projection matrix may each be set and the scene may be rendered. A swap function may be then called by the application to instruct the GPU to put the current set of rendered items into a back buffer and then from the back buffer into the front buffer. The images may then be sent out for display.

In some embodiments, the 3D application may query for the stylus and/or head position each frame. Each frame may be a left-right pair that is generated after receiving the queried stylus and/or head position and placed in a swap buffer 430. Thus, in some embodiments, the tracking information may be updated at least as often as the specified frame rate by the application.

It is noted that multiple applications may be running simultaneously, and that each may be configured to query tracking system 412 for the position matrix. In one embodiment, the position matrix may provide one eye position at a time.

Content processing system 420 may also be configured to provide haptic information to the user control device. The haptic information may cause the user control device to jitter, for instance, if the user control device includes a haptic vibration motor. As one example, if a user moves a stylus to one side and hits a boundary in the volume object model, a signal, or haptic information, may be sent to the stylus to make it jitter and vibrate.

In some embodiments, system 400 may include 3D audio devices (not shown). By changing the amplitudes and phase angles of the sound waves reaching the user's left and right ears, the device can effectively emulate the position of the sound source. The sounds reaching the ears may be isolated to avoid interference. The isolation can be accomplished by the use of earphones or the like. As is the case with the graphics objects, the position of the sound source may be determined based on user view and control information and on display information.

As a practical example of the system of FIG. 4, consider a graphics object such as the image of a bear cub 180 from FIG. 1. Since the cub appears in open space above the viewing surface, a user can reach in and manipulate the cub by hand or with a handheld tool, such as a stylus. It is also possible for the user to view the cub from different angles, as they would in real life. This may be accomplished through the use of triangulation where the sensors continuously (e.g., 100 times per second) send images to the tracking system. The sensor data enables the tracking and content processing systems to locate, track, and map the user's view and control positioned within and around the display's viewing surface.

An interactive 3D display environment may also include 3D sounds emanating from the cub's mouth. By determining the location of the user's head (and thereby ears), the system may modify the spatial characteristics of the audio, making it appear that 3D sound is emanating from the cub's computer-generated mouth. The system may continuously locate and track the end-user's "left and right ear" and their "line-of-hearing". This may enable real-time generation of sounds based on the location of the user's left and right ears, which then allows the user to freely move his head and still hear 3D sounds emanating from his correct location.

By facilitating a tight knowledge of the relationship between the user view, user control, and the display and a tight coupling of various subsystems of system 400, millimeter precision of movement and perspective may be achieved. Further, the tight coupling may improve fluidity of the display and, as a result, make the system more realistic.

FIG. 5A-D—Display Angle

Figure 5A:
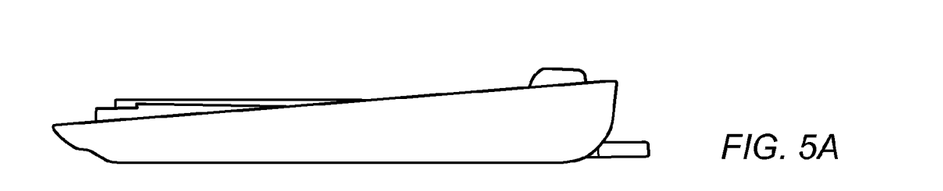
FIGS. 5A-D illustrate example tilt configurations of a display, according to some embodiments.
Figure 5B:
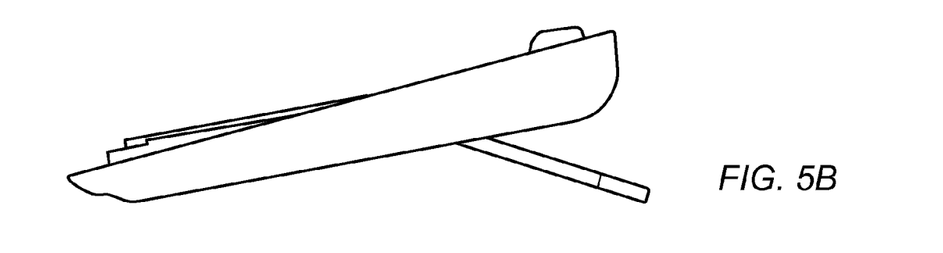
Figure 5C:
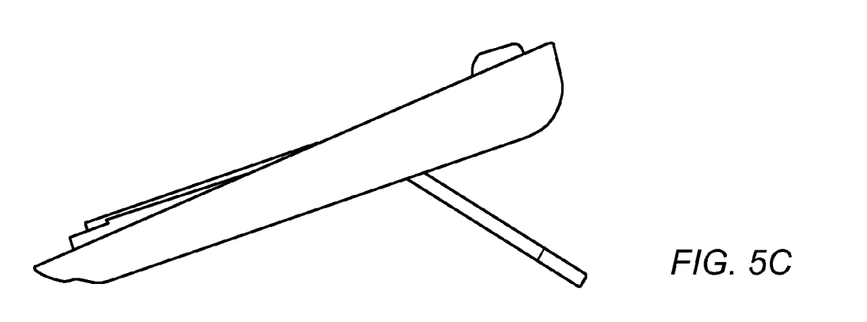
Figure 5D:
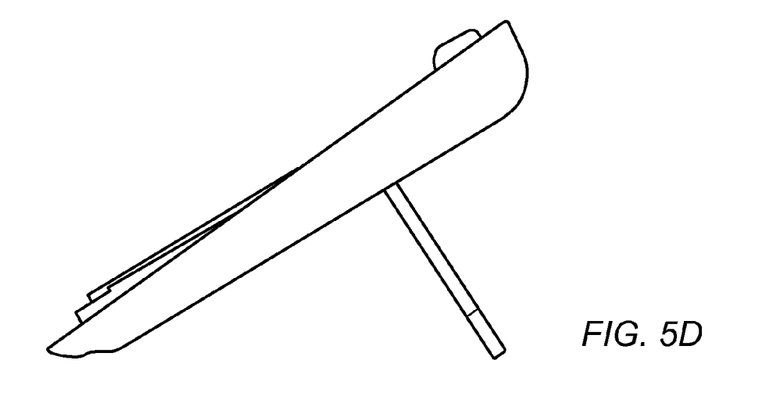

FIGS. 5A-D illustrate an example tilt sequence of display 300. FIG. 5A illustrates display 300 in a substantially horizontal position. For example, this position may represent a tabletop view as if the display is resting on a tabletop with a tilt angle of approximately 0 degrees. FIGS. 5B-5D represent a progression of tilt angle from about 20 degrees, to about 30 degrees, to about 40 degrees. As described herein, display 500 may include a mechanism to determine the display angle of the display 500. For example, display system 402 may include an accelerometer. Values from the accelerometer may then be converted into an angle. In other instances, display system 402 may not include a continuous range of tilt possibilities. Instead, display system 402 may include multiple latches where the display may be tilted and locked into one of the latches. As one example, latches may represent a discrete set of possible angles (e.g., 15, 30, and 45 degrees). Thus, in such an embodiment, the display may be configured to be flat (approximately 0 degrees), tilt to 15 degrees, tilt to 30 degrees, or tilt to 45 degrees. In some embodiments, a display angle may be provided to the system via user entry.

Figure 6:
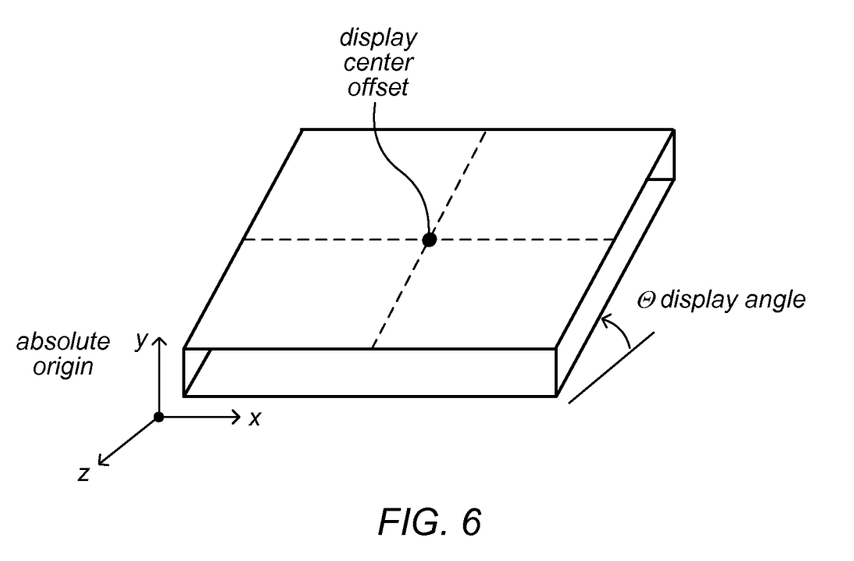
FIG. 6 illustrates an example display status, according to some embodiments.

FIG. 6—Display Center Offset

FIG. 6 is a diagram of a display center offset with respect to an absolute origin. The display offset may be a position of the center of the display screen. The display screen center may be calculated from an absolute origin point based on the dimensions of the display screen and a display angle of the screen. The display offset value may indicate where the center of the screen is relative to an absolute reference point. The display center offset may be used in tracking computations and or content processing computations to generate a more accurate and realistic interactive environment.

Figure 7:
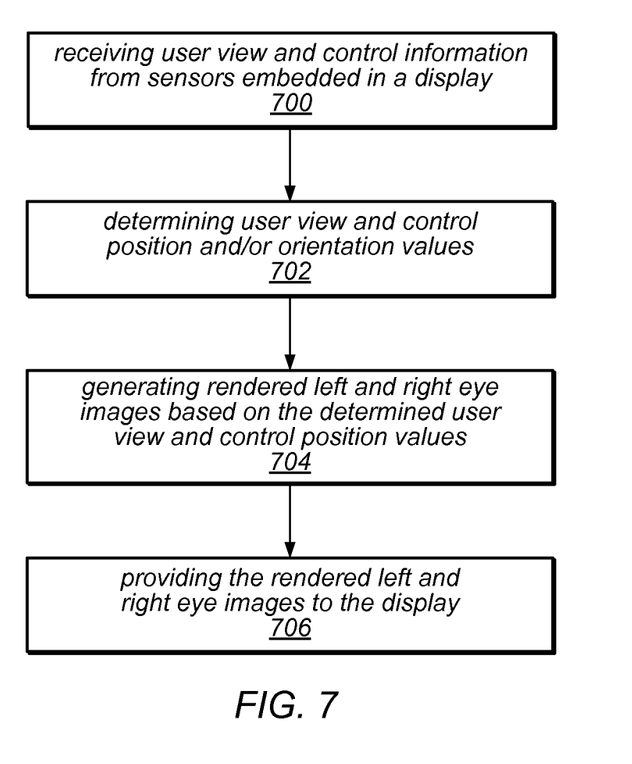
FIG. 7 is a flowchart illustrating one embodiment of a method for displaying a 3D interactive environment, according to some embodiments.

FIG. 7—Example Method for Displaying 3D Images

FIG. 7 illustrates a method for displaying 3D images in an interactive environment (e.g., based on user view and/or user control). The method of FIG. 7 may be used in conjunction with any of the computer systems or devices shown in the above figures, among other devices. In various embodiments, some of the method elements shown may be performed concurrently, in a different order than shown, or may be omitted. In some embodiments, the method of FIG. 7 may include additional (or fewer) steps than shown. As shown, the method may operate as follows.

At 700, user view and/or control information may be received from one or more sensors embedded in a display device. Additional information may also be received. For example, additional user control information may be received from an accelerometer and/or gyroscope in a user control device. In some embodiments, display angle and/or display center offset information may also be received. Further, in some instances, other display information may be received, such as display dimensions (e.g., length, width, depth) and/or resolution. The display information may be determined or received via a variety of methods. For example, the display information may be provided by a user, determined during a calibration routine, determined using one or more position sensors (e.g., that are attached to the display), determined using cameras, etc. Further details regarding the determination of display information can be found in U.S. Provisional Patent Application No. 61/426,451, which was filed on Dec. 22, 2010, whose inventors were Michael A. Vesely, Peter F. Ullmann, and Jerry Tu, which is hereby incorporated by reference in its entirety as if fully and completely set forth herein.

In some embodiments, the same sensors may be configured to capture inputs from the user view and user control. In other embodiments, one or more sensors may be configured to capture user view input(s) and a different one or more sensors may be configured to capture user control input(s). The capturing of the user view and user control inputs may be performed at the same time, or during non-overlapping time periods (e.g., user view capture during one time period, user control capture during another time period). Capturing the user view position input may include synchronizing to an activation of a first light source (e.g., embedded in the display device) and capturing the user control position input may include synchronizing to an activation of a second light source (e.g., in a user control device).

As shown at 702, user view position and/or orientation values and/or user control position and/or orientation values may be determined. In some embodiments, a display plane position and/or orientation value may also be determined. Such determinations may be based on at least a portion of the information received at 700. For example, a user view position and orientation value(s) may be determined based on user view position and orientation information (e.g., from image views), respectively, captured by one or more sensors embedded in the housing of the display system. Other additional user view information may also be used, such as position information from an instrument (e.g., accelerometer) in 3D glasses 140. User control position and orientation value(s) may similarly be determined, as described herein.

In one embodiment, in order to provide the stereoscopic image with the proper perspective, the user's viewpoint position and angle relative to the display may be determined. For example, the method may determine the angle formed between the plane of the display surface and the line of sight of the user. Accordingly, instead of assuming a certain angle for each display (e.g., 90 degrees for a vertical display and 45 degrees for a horizontal display), the method may actually determine the angle by using the viewpoint location and the display location described above. Thus, where the viewing angle relative to the display is 43 degrees, a perspective corresponding to 43 degrees may be used rather than assuming an angle of 45 degrees. Thus, the determination of the viewpoint not only determines what angle of the scene the user sees in a 3D image (which is the typical purpose of head tracking), but also how the user sees it (i.e., the perspective of the 3D image corresponds to the user's changing viewpoint). The particular methods by which the 3D image is rendered in order to achieve this effect are varied. Additionally, while the above descriptions refer to angles in only two dimensions, it should be understood that the viewpoint location angle may also be determined and adjusted for in the third dimension (e.g., not just z and y, but also z and x, as well as pitch, yaw and roll among other possibilities).

As illustrated at 704, rendered left and right eye images may be generated based on the determined user view position and orientation values and/or user control position and orientation values. In some instances, a 3D graphics application may query a tracking system that determined the values and based on receiving the values, the 3D graphics application may generate properly rendered images. In one embodiment, blocks 702 and 704 may be performed by different processors. For example, a dedicated processor may perform block 702 and a different dedicated or shared processor in a PC may perform block 704. As a result, each of blocks 702 and 704 may be more responsive and as a result, yield improved fluidity and accuracy of the display environment.

At 706, the rendered left and right eye images may be provided to the display. The rendered images may be accurate to within 1 millimeter in terms of position resulting in a fluid, realistic display environment.

Note that the determination of the perspective and provision of the stereoscopic image may be performed for each display used to provide the 3D image. Thus, when using a vertical display and a horizontal display, the correct perspective may be determined for each display (e.g., since the angle of the user's viewpoint relative to the display will be different for each, owing to their different positions/angles). Thus, the 3D image may be provided for display using one or more displays and may provide a corresponding projection (for each display) that corresponds to the user's viewpoint. For example, a first perspective may be determined for a vertical display based on a viewing angle of 2 degrees for the first display and a second perspective may be determined for a horizontal display based on a viewing angle of 47 degrees all using the same viewpoint position, then the stereo rendering for each display will have their respective projections.

The method described above may be repeatedly performed while providing 3D images via the one or more displays. For example, the method may repeatedly perform 700-706 as the user moves a user control device and changes his viewpoint, or as a display changes position (e.g., tilted up/down). Thus, updated inputs may be received at 700 and blocks 702, 704, and 706 may be repeated based on the updated inputs. For example, if the user moves the display to have a new angle with respect to the user's viewpoint (e.g., for each of viewing), then the method may update the projection of the stereoscopic images for that display to insure the rendered projective images reflect the perspective based on the new relationship between the user's viewpoint and the position of the display. Thus, the method may continually update the perspective driven projection of stereoscopic images of a 3D image based on changes in the 3D image, e.g., due to stylus interaction, underlying changes in the graphics scene, etc., changes in the user's viewpoint, and/or changes in the position or orientation of the display(s).

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system, comprising:
    a display system comprising:
        a housing;
        a display comprised in the housing and configured to display a rendered left eye image and a rendered right eye image; and
        one or more of tracking sensors comprised in the housing and configured to sense at least a first input and a second input within a volume region, wherein the sensed first input includes user view position and orientation information, and wherein the sensed second input includes user control position and orientation information;
    wherein the one or more tracking sensors have fixed geometric relationships with the display, including a respective position and orientation offset with respect to the display; and
    wherein the user view position and orientation information and the user control position and orientation information are used in generating the rendered left and right eye images for display.

2. The system of claim 1, wherein the one or more tracking sensors include first and second image capture detectors,
    wherein to sense the first input, the first image capture detector is configured to capture an image view corresponding to the first input, and
    wherein the second image capture detector is configured to capture an image view corresponding to a third input that is also used to generate the user view position and orientation information.

3. The system of claim 2, wherein the one or more tracking sensors further include third and fourth image capture detectors,
    wherein to sense the second input, the third image capture detector is configured to capture an image view corresponding to the second input, and
    wherein the fourth image capture detector is configured to capture an image view corresponding to a fourth input that is also used to generate the user control position and orientation information.

4. The system of claim 1, wherein to sense the at least two inputs within the volume region, the one or more tracking sensors are further configured to synchronize to a light source that is activated during sensing of at least one of the first or second input.

5. The system of claim 1, wherein the user control position and orientation information is the position and orientation information of a pointing device.

6. The system of claim 1, wherein to sense the at least two inputs within the volume region, the one or more tracking sensors are further configured to:
    during a first time period, sense the first input; and
    during a second time period that does not overlap the first time period, sense the second input.

7. The system of claim 6, wherein to sense the first input, a first tracking sensor of the one or more tracking sensors is configured to synchronize to a first light source, embedded within the display system, that is activated during the first time period, and wherein to sense the second input, a second tracking sensor of the one or more tracking sensors is configured to synchronize to a second light source, embedded in a pointing device, that is activated during the second time period.

8. The system of claim 6, where each of the first and second time periods is less than 3 ms.

9. The system of claim 1, wherein to generate the rendered left and right eye images, the system further includes:
    a tracking system coupled to the display system, wherein the tracking system is configured to determine tracking values that include a user view position and orientation value and a user control position and orientation value based on at least a portion of the user view position and orientation information and user control position and orientation information, respectively, received from the one or more tracking sensors; and
    a content processing system coupled to the display system and the tracking system, wherein the content processing system is configured to generate the rendered left eye image and the rendered right eye image based on the determined tracking values, received from the tracking system, wherein generating the rendered left and right eye images includes updating graphics objects of an application based on the tracking values.

10. The system of claim 9, wherein the tracking system is further configured to gather additional user view position or orientation information or additional user control position or orientation information, wherein the determined user view and user control position and orientation values are further based on the additional user view position or orientation information or additional user control position or orientation information, respectively.

11. The system of claim 9, wherein the user view position and orientation value is further based on a calculated user view center and an inter-ocular distance value to generate a distinct left eye position value and a distinct right eye position value.

12. The system of claim 9, wherein the content processing system is further configured to store the rendered left eye image and the rendered right eye image in a buffer.

13. The system of claim 9, wherein the content processing system is configured to initialize a 3D mode that enables the system to synchronize the rendered left and right eye images to left and right eye frames, respectively.

14. The system of claim 9, wherein the tracking system is further configured to receive an angle or orientation of a surface of the display, wherein the rendered left and right eye images are also based on the angle or the orientation of the display surface.

15. The system of claim 14, wherein the display includes a detector configured to measure the angle or orientation of the surface of the display.

16. The system of claim 9, wherein the user view position and orientation value includes a left eye user view position and orientation value and a right eye user view position and orientation value.

17. The system of claim 9, wherein the user control position and orientation value includes a left eye user control position and orientation value and a right eye user control position and orientation value.

18. The system of claim 1, further comprising:
one or more speakers configured to play 3D audio;
wherein the user control position and orientation information and user view position and orientation are used in generating the 3D audio.

19. A method for presenting three-dimensional (3D) images using a display, comprising:
receiving a user view position input and a user control position input from one or more sensors that are embedded in a display device such that the one or more sensors have fixed geometric relationships with the display, including a respective position and orientation offset with respect to the display;
determining a user view position value and a user control position value based on the received user view position input and user control position input, respectively;
generating rendered left and right eye images based on the determined user view and control position values; and
providing the rendered left and right eye images to the display.

20. The method of claim 19, further comprising:
receiving a user view orientation input and a user control orientation input from the one or more sensors; and
determining a user view orientation value and a user control orientation value based on the received user view orientation input and a user control orientation input, respectively;
wherein said generating is also based on the determined user view and control orientation values.

21. The method of claim 20, further comprising:
receiving an updated user view position input, an updated user view orientation input, an updated user control position input, and an updated user control orientation input from the one or more sensors, wherein the updated user view orientation input is different than the user view orientation input;
determining updated user view position and orientation values and updated user control position and orientation values based on the received updated user view position and orientation inputs and updated user control and orientation position inputs, respectively;
generating updated rendered left and right eye images based on the updated determined user view and control position orientation values, wherein the updated rendered left and right eyes images are different than the rendered left and right eye images; and
providing the updated rendered left and right eye images to the display.

22. The method of claim 19,
wherein the one or more sensors includes two cameras for capturing the user view position input and another two cameras for capturing the user control position input;
wherein capturing the user view position input is performed during a first time period and capturing the user control position input is performed during a second time period that is different than the first time period.

23. The method of claim 22, wherein said capturing the user view position input includes synchronizing to an activation of a first light source and wherein said capturing the user control position input includes synchronizing to an activation of a second light source.

24. The method of claim 19, wherein the rendered left and right eye images are accurate to within 1 millimeter in terms of position.

25. A non-transitory computer-readable memory medium storing program instructions for presenting stereoscopic three dimensional (3D) images using a display, wherein the program instructions are executable by a processor to perform:
receiving a user view position and orientation value and a user control position and orientation value, which are based on user view position and orientation information and user control device position and orientation information, respectively, wherein the user view position and orientation information and user control device position and orientation information are produced by one or more sensors embedded in a display device such that the one or more sensors have fixed geometric relationships with the display, including a respective position and orientation offset with respect to the display;
generating rendered left and right eye images based on the received user view and control position and orientation values; and
providing the rendered left and right eye images to the display.

26. A system, comprising:
a display system comprising:
a housing,
a display comprised in the housing and configured to display a rendered left eye image and a rendered right eye image, and
one or more of tracking sensors comprised in the housing and configured to sense at least a first input and a second input within a volume region, wherein the one or more tracking sensors are configured to generate user view position and orientation information based on the first input, and to generate user control position and orientation information based on the second input,
wherein the one or more tracking sensors have fixed geometric relationships with the display, including a respective position and orientation offset with respect to the display;
a tracking system coupled to the display system, wherein the tracking system includes a tracking processor and a tracking memory medium, wherein the tracking processor is configured to execute instructions stored on the tracking memory medium to:
determine tracking values comprising a user view position and orientation value and a user control position and orientation value based on at least a portion of the user view position and orientation information and user control position and orientation information, respectively, received from the one or more tracking sensors; and a content processing system coupled to the display system and the tracking system, wherein the content processing system includes a content processor and a content memory medium, wherein the content processor is configured to execute instructions stored on the content memory medium to:

generate the rendered left eye image and the rendered right eye image for display based on the determined tracking values, wherein generating the rendered left and right eye images includes updating graphics objects of an application based on the tracking values.

\* \* \* \* \*